United States Patent
Sherman

(10) Patent No.: US 11,991,303 B1
(45) Date of Patent: May 21, 2024

(54) VOICE CONTROLLED AND SELF INTEGRATED DRIVING HEADSET

(71) Applicant: Wilson Sherman, San Diego, CA (US)

(72) Inventor: Wilson Sherman, San Diego, CA (US)

( * ) Notice: Subject to any disclaimer, the term of this patent is extended or adjusted under 35 U.S.C. 154(b) by 0 days.

(21) Appl. No.: 18/426,320

(22) Filed: Jan. 29, 2024

(51) Int. Cl.
*H04W 4/90* (2018.01)
*H04M 1/60* (2006.01)
*H04M 1/72409* (2021.01)

(52) U.S. Cl.
CPC ... *H04M 1/724097* (2022.02); *H04M 1/6075* (2013.01); *H04W 4/90* (2018.02)

(58) Field of Classification Search
CPC ....... H04W 4/02; H04W 4/024; H04W 4/025; H04W 4/80; H04W 4/90; H04M 1/6075; H04M 1/724094; H04M 1/724097; H04M 1/72412; H04M 1/72418; H04M 1/72421
USPC ...................................................... 455/569.2
See application file for complete search history.

(56) References Cited

U.S. PATENT DOCUMENTS

| | | | | |
|---|---|---|---|---|
| 10,401,081 B2* | 9/2019 | Jorapur | ................ | A47F 3/0426 |
| 2004/0001588 A1* | 1/2004 | Hairston | ............... | H04M 1/271 |
| | | | | 379/419 |
| 2007/0026850 A1* | 2/2007 | Keohane | ............. | H04M 1/6075 |
| | | | | 455/418 |
| 2014/0321662 A1* | 10/2014 | Kihm | ................... | H04R 5/0335 |
| | | | | 381/74 |
| 2016/0070702 A1* | 3/2016 | Mao | ...................... | H04L 67/535 |
| | | | | 715/716 |
| 2018/0139315 A1* | 5/2018 | Kalhan | .................... | H04R 5/04 |
| 2022/0319121 A1* | 10/2022 | Floutier | ................. | G06F 3/011 |
| 2023/0319454 A1* | 10/2023 | Stidsen | ............... | H04R 1/1058 |
| | | | | 381/74 |

* cited by examiner

*Primary Examiner* — Jean A Gelin

(57) ABSTRACT

This patent outlines an advanced communication device designed to combat the rising issue of distracted driving and walking. The invention leverages voice control technologies and smart communication management to minimize driver distractions from mobile device use. Key features include the ability to access cellular networks without relying on a traditional mobile phone and an integrated voice control interface for manual-free operation. The device is adept at intelligently managing communications based on the driver's motion status and can automatically alter operational modes to prioritize emergency functions during travel. Additionally, it incorporates: an emergency communication system for manual-free call activation; advanced multimedia functionalities, allowing for the hands-free capture and transmission of photos and videos; and the capability to audibly read digital content. Enhanced by modular design elements and remote charging capabilities, the invention represents a significant advancement in driver and walking safety technology.

6 Claims, 2 Drawing Sheets

VOICE CONTROLLED AND SELF INTEGRATED DRIVING HEADSET

BACKGROUND

The present invention relates generally to communication technologies designed to prevent distracted driving. More specifically, it relates to a device that enhances driver safety and walking safety by minimizing distractions from mobile device interactions, leveraging voice control technologies, and intelligently managing communications while in motion. One of the chief merits of the present invention is that it aids safe walking as it functions solely with voice technology audio, and does not have a screen encouraging distraction, allowing those in motion with a mobile phone to watch where they are going. The invention is the end result of public safety work performed by the inventor in conjunction with the Automobile Safety Foundation founded in 1988, so the invention's validity is backed by 35 years of safety research by a ASF respected non profit organization. The ASF motto is "Eyes on the Road-Hands on the Wheel."

Distracted driving, attributed largely to the use of mobile devices while driving, has become a significant safety concern in recent years. The advent of smartphones and other communication technologies has introduced challenges in maintaining road safety, leading to increased accidents and fatalities. It should be noted that the federal agency, the NHTSA, calls distracted driving (and walking) a global "deadly epidemic."

Distracted walking incidents are on the rise, and everyone with a cell phone is at risk. We are losing focus on our surroundings and putting our safety at risk. Over half of distracted walking injuries occur in our own homes, proving that we need to stay aware of our surroundings whether indoors and out. The solution is a phone without a screen which distracts eyes from dangers in the environment. The recognized distracted driving, walking, and phone addiction safety and health crisis, pose a requirement that this new safety invention that can save lives and help prevent injury.

In the world today there are more mobile phone subscribers than people. Though modern mobile phones and smartphones have advanced communications, they are also the chief cause of distracted driving and walking accidents, and "phone addiction," engendering a global public safety, and health crisis. Most businesses have hazardous and outdated public telecom that encourage prompt pushing/text messaging accidents. Safe Call-Earphone allows for voice response that can push these prompts while on a call to the business, precluding looking at the phone to text message. "Safe Call-EarPhone is not an official trademark name but a proposed name, as it helps define the use of the new invention.

Phone addiction is the obsessive use of a smartphone. The behavioral addiction is often dubbed as "nomophobia," or the fear of being without a mobile device. There are over 3.8 billion smartphone users in the world. Research published by Virgin Mobile discovered that those billions of smartphone users receive 427% more messages and notifications than they did a decade ago. They also send 278% more texts. The rise in phone use seems like a natural necessity for modern life, however, it can also cause concern and negative consequences. The heavy use of these devices has consumers questioning their cellular habits. According to Google Trends, since 2004 searches for "cell phone addiction" have been rising. Due to phone addiction, that even involves children in their formative years, that will be developing medical problems, such as harm to eyesight and posture, as well as distracted walking and biking accidents, therefore the new Safe Call-EarPhone invention a required invention to help address child safety and health.

The NHTSA calls distracted driving a "deadly epidemic." Pedestrian accidents and fatalities have been rising sharply over the last several years.

Elon Musk quipped on a TV interview, "people. are addicted to AI . . . their smartphones."

In a fog, staring at their "smartphones" screens, researching, or engaging in texting, people are walking off cliffs, falling into manholes, and causing car accident. Many unlawfully text while driving. This smartphone news is such a shocker it could almost serve as yarn for a Hollywood sci-fi movie featuring an evil AI villain. The plot consists of, of an AI machination . . . hijack, and entrap the human race, with a covert phone addiction weapon, that can entrap the unwary human victim, staring at their little screen in a hypnotic stupor, that then leads them down the road to doom.

The distracted driving and walking crisis pose an imminent threat to the worldwide safety of children, families, employees, and everyone 24/7! Folks don't know it, but this may be WW III . . . man vs. machine, and for the wellbeing of man, the evil AI villain must be vanquished, and human safety restored.

One text request causes dangerous distraction that can sink the Titanic. People can walk and talk, cook and talk, and drive and talk, but the eyesight is singular, and when in motion, one must, "watch where you're going."

Recent developments in this field have aimed at reducing distractions by identifying and restricting the use of mobile devices in vehicles. The patent application "Systems and Methods for Distracted Driving Prevention" (US Patent Application #20200228646) discloses a system that identifies mobile devices within a vehicle using Bluetooth beacons and GPS tracking, subsequently restricting device functionalities to mitigate distracted driving risk.

Similarly, "Distracted Driver Prevention Systems and Methods" (US Patent Application #20160101784) focuses on a diagnostics device within the vehicle that communicates with the user's device to determine driving status. This patent underscores the importance of context-aware systems in preventing distracted driving, a crucial element for any technology aimed at enhancing road safety.

Despite these advancements, there remains a significant gap in the market for a device that combines the functionality of standalone communication with the safety and convenience of hands-free, voice-controlled operation. The present invention aims to fill this gap by providing a device that leverages advanced voice control technologies for a wide range of functionalities, including emergency calls, without the need for manual activation or screen interaction.

SUMMARY

In view of the circumstances outlined above, aspects of the present invention disclose systems and methods for a communication device designed to minimize driver distraction and walking distraction. This invention addresses the limitations of current distracted driving technologies by presenting a novel communication device specifically designed to enhance road safety through eyes hands-free operation hands-free operation and intelligent communication management, therefore, providing a simple and safe phone use experience.

According to an aspect of the present invention, there is provided a communication device designed to minimize driver and walking distraction comprising: a means for accessing cellular networks independently of a traditional mobile phone; integrated voice control technology for operation without manual interaction; features for automatically modifying operational modes and prioritizing emergency functions during travel; and an emergency communication system enabling calls without manual activation and an automatic alert system for emergencies based on user status and location.

Additionally, (and optionally) the invention encompasses advanced multimedia functionalities, enabling hands-free capture and transmission of photos and videos, as well as receiving and audibly reading digital content like news, emails, and text messages. This not only broadens the device's utility but does so without compromising the primary focus on driver safety. Modular design elements and wireless charging capabilities further enhance the device's adaptability and user convenience, making it suitable for a wide range of preferences and scenarios.

Furthermore, the present invention is designed for potential integration with vehicle diagnostic and control systems, amplifying its safety features. This integration could lead to future advancements in automated driving assistance and real-time traffic updates. The device's flexibility in configuration, including detachable headbands and two-part charging units, caters to diverse user needs, emphasizing its role as a versatile and innovative solution in the field of driver safety technology.

DETAILED DESCRIPTION

Figure 1:
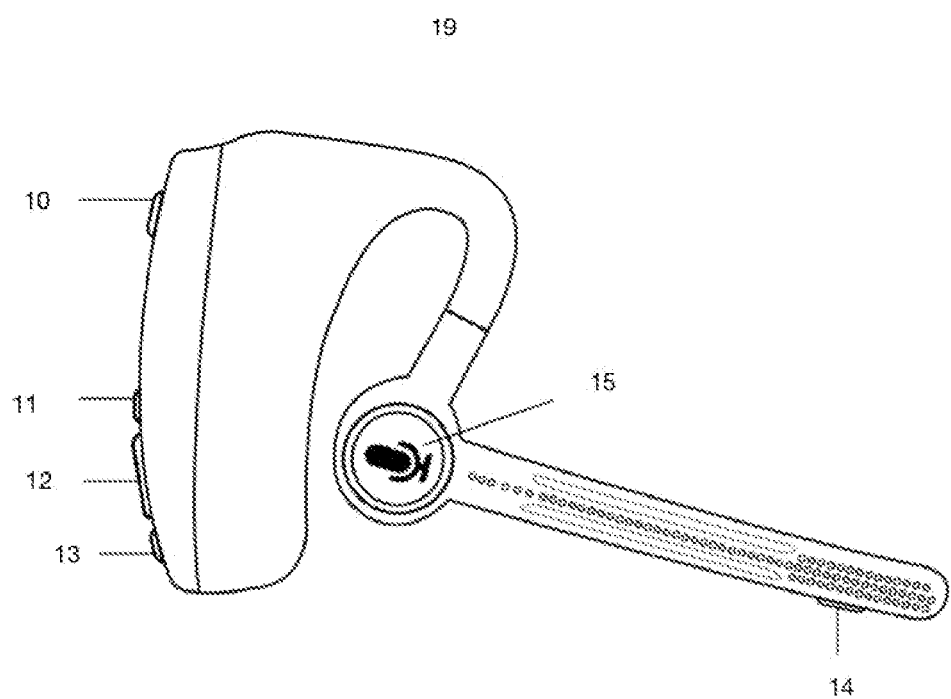
FIG. 1: depicts the communication device, highlighting its innovative ergonomic design integrated with advanced features.

FIG. 1: External Configuration and User Interface of the Communication Device

FIG. 1 depicts a view of the external physical design and user interface of the communication device. This embodiment illustrates a compact, ergonomic design tailored for ease-of-use and comfort. The device includes several features comprising: a voice controlled interface 15 which facilitates voice-activated command inputs promoting hands-free use; motion detection sensors 11 capable of discerning vehicular motion, thereby enabling dynamic adjustment of operational states in response to vehicular movement; emergency communication buttons 12, 13 positioned for optimal accessibility supplementing voice activated controls; modular design elements including a detachable headband for enhanced user comfort; a wireless charging outlet 14; and a camera 10 to capture and transmit multimedia content, including photos and videos.

The result of the above combines into a simple, eyes and hand free, mobile telephone experience.

Figure 2:
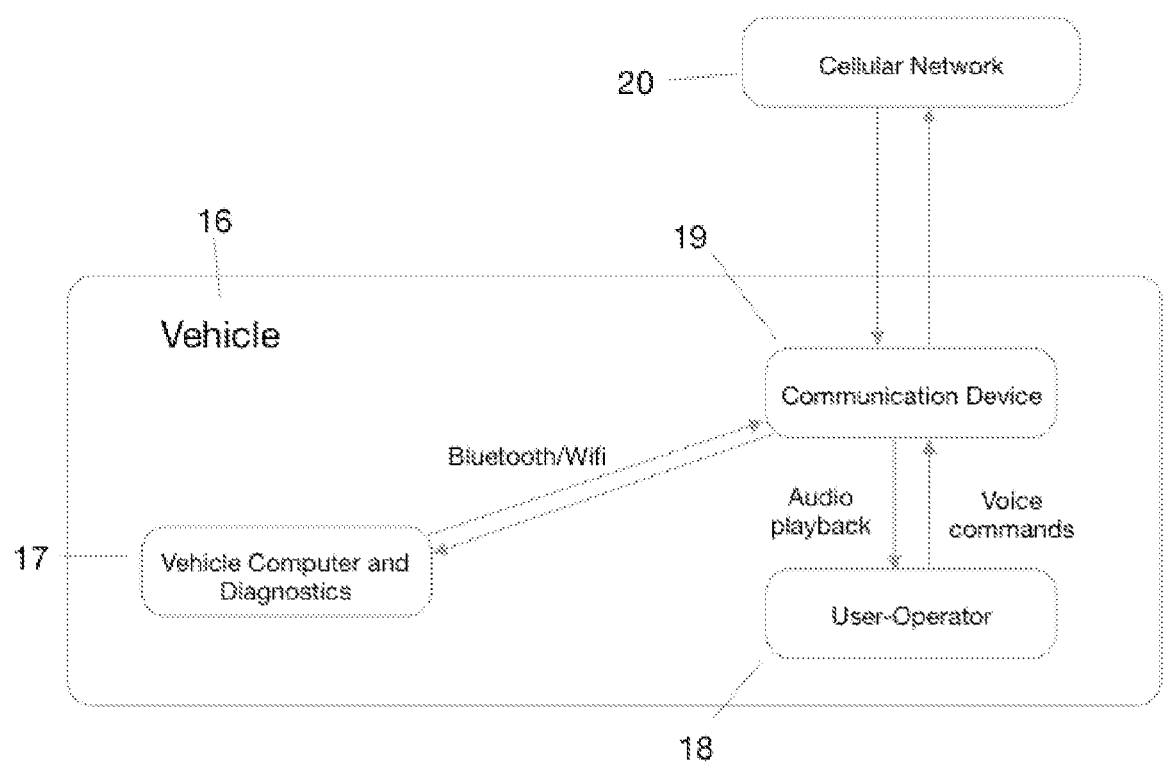
FIG. 2: depicts the communications schema, wherein the communication device seamlessly connects with cellular networks and vehicle diagnostics.

FIG. 2: Multipolar Wireless Interaction

FIG. 2 depicts the interaction between the communication device 19, cell networks 20, and a vehicle's diagnostic and control systems 17. This embodiment includes components or processes comprising: cellular communication between the device and the associated cellular network infrastructure 20; the vehicle dashboard integration wherein the communication device 19 is positioned within range of the car's wireless systems 17 showcasing the exchange of data via wireless communication protocols such as Bluetooth or Wi-Fi; information exchange wherein data is transmitted between the device and the vehicle's systems, particularly concerning vehicular motion status; adaptive operational indicators which adjust based on the data communication received by the device from the diagnostics within the vehicle; and driver-device interaction, wherein the voice commands articulated by the user 18 are received and processed by the communication device 19 facilitating intelligent hands free interaction. A GPS locator may also be provided.

The embodiments described above are given for the purpose of facilitating the understanding of the present invention are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined together.

Safety First. Per the need to make phone calls, or internet research, while in motion, Safe Call-Earphone goal is to keep walkers, drivers, and children, free to watch where they are going and be safe! All operation is enacted verbally, with no requirements for visual or hand interplay with the device. Without a screen, and the screen's numerous associated parts, the phone is safe, simple, and affordable.

What is claimed is:

1. A Safe Call-EarPhone headset device is designed to minimize driver, walker, and biker distraction, comprising: a means for accessing cellular networks independently of a traditional cellular mobile phone; an integrated voice control interface for operation without manual interaction; hands-free capability to capture and transmit multimedia content, including photos and videos, as well as receive and audibly reading digital content like news, emails, and text messages; a feature enabling emergency calls without manual activation; an automatic alert system for emergency situations based on user status and location; built communications systems to monitor and react to vehicle related diagnostics, wherein said device is configured to automatically modify operational modes based on motion detection to reduce distractions while driving.

2. The device of claim 1, wherein the device includes: modular design elements for customization and adaptability; features facilitating remote charging.

3. The device of claim 1, further comprising: a means for integration with vehicle diagnostic and control systems to enhance safe driving practices.

4. A communication device according to claim 1, wherein the device includes various physical embodiments to accommodate different use cases and user preferences comprising, a detachable headband, a two ear-piece system.

5. The device of claim 1, further comprising a wireless charging feature, enabling the device to be charged without wired connection to a charging source.

6. The device of claim 1, further comprising a GPS location.

* * * * *